Nov. 7, 1950      B. C. PETERSEN      2,529,413
ARTJOPAT DESIGNING BOARD
Filed April 13, 1948      2 Sheets-Sheet 2
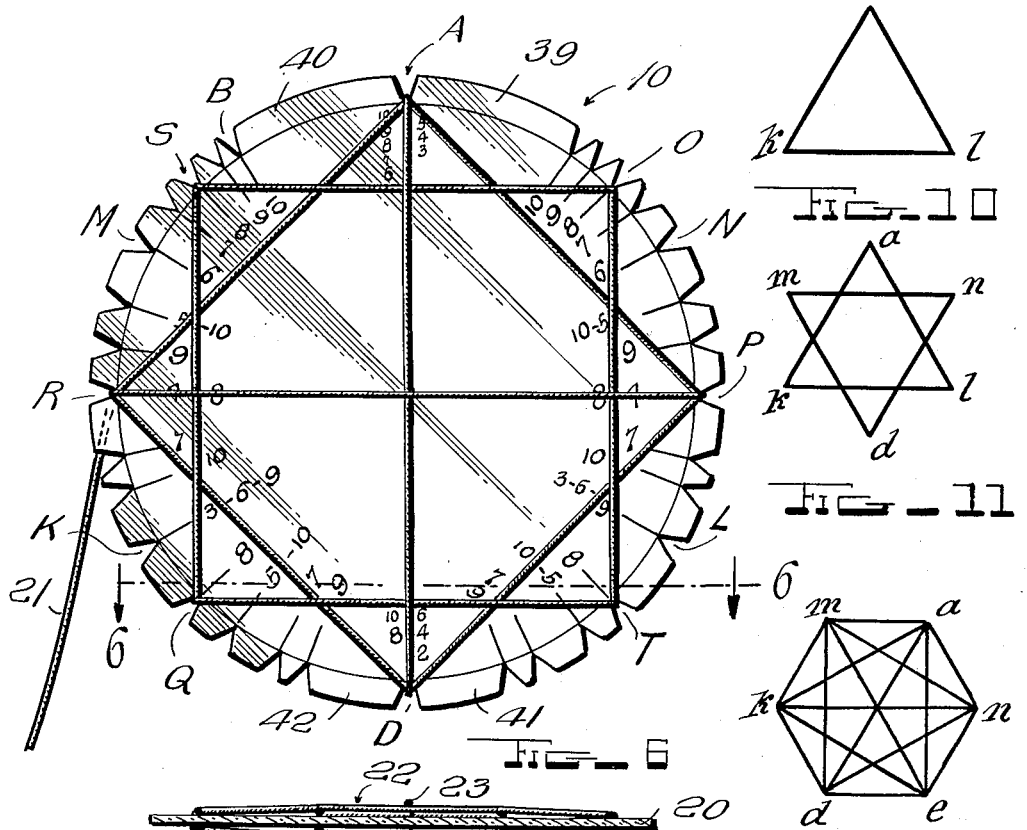
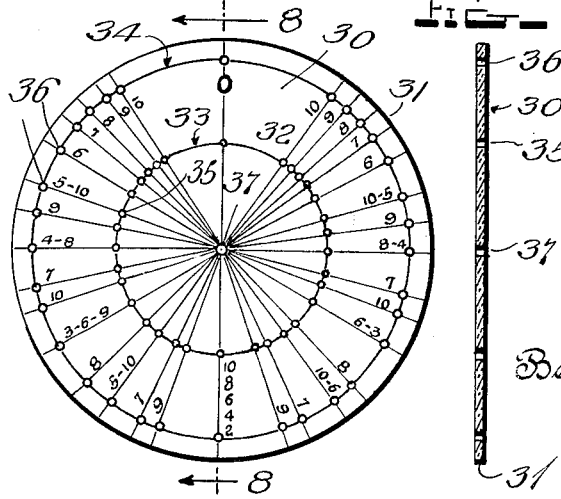
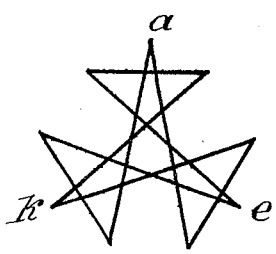
INVENTOR.
Benton C. Petersen,
BY
John B. Brady
ATTORNEY

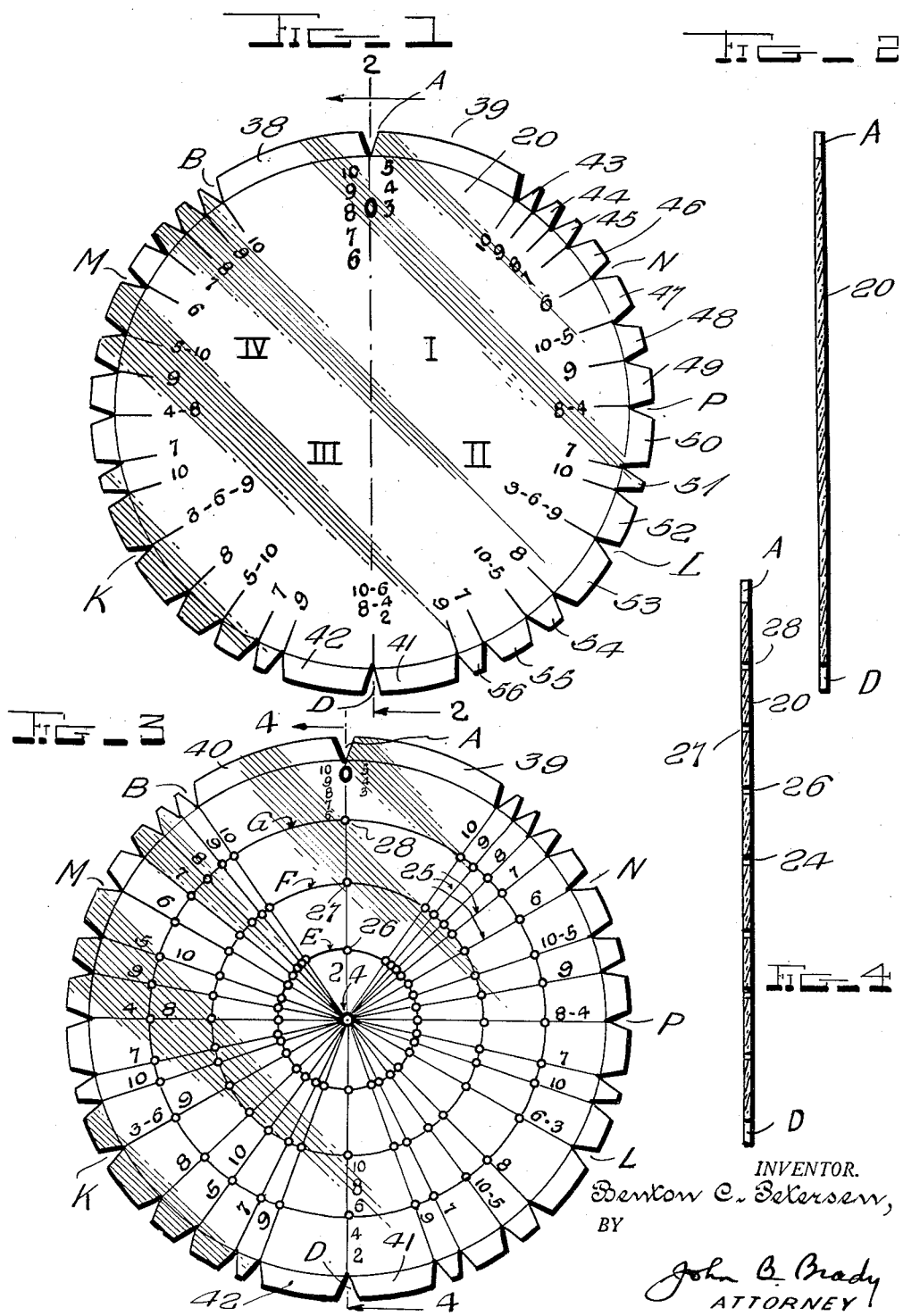

Patented Nov. 7, 1950

2,529,413

UNITED STATES PATENT OFFICE 2,529,413

ARTJOPAT DESIGNING BOARD

Benton C. Petersen, Salina, Kans.

Application April 13, 1948, Serial No. 20,724

2 Claims. (Cl. 35—27)

My invention relates broadly to educational appliances and more particularly to a construction of device for forming geometrical designs and aiding instruction on drawing and the solving of arithmetical problems.

One of the objects of my invention is to provide an arrangement of designing board having a surface extending in unitary plane and terminating in a calibrated and preformed periphery shaped to allow a thread to be wound and looped around the board for forming predetermined geometrical figures.

Another object of my invention is to provide a construction of designing board having a perforated surface and a notched perimeter with the perforations and notches disposed in a predetermined pattern for facilitating the setting up of a wide variety of geometrical forms of predetermined dimensions.

Stil another object of my invention is to provide a construction of flat designing board having an arithmetically calibrated surface thereon and equipped with a multiplicity of perforations and preformed peripheral notches related to the calibrations for facilitating the forming of designs with a textile thread insertable through the perforations and between selected peripheral notches.

A still further object of my invention is to provide a numerically calibrated plane structure for solving dimensional and geometrical linear problems.

Other and further objects of my invention reside in the construction of geometrical instrument as described more fully in the specification hereinafter following by reference to the accompanying drawings, in which:

Figure 1 is a front elevational view of one form of geometrical designing board embodying the principles of my invention; Fig. 2 is a vertical sectional view taken on line 2—2 of Fig. 1; Fig. 3 is a front elevational view of a modified form of the geometrical designing board of my invention; Fig. 4 is a vertical sectional view taken on line 4—4 of Fig. 3; Fig. 5 shows the geometrical designing board of Fig. 1 in use for the preparation of geometrical outlines in various shapes by the winding and looping of a textile thread; Fig. 6 is a cross sectional view taken on line 6—6 of Fig. 5; Fig. 7 is a front elevational view of a further modified form of my invention; Fig. 8 is a vertical sectional view taken on line 8—8 of Fig. 7; and Figs. 9, 10, 11 and 12 are typical geometrical forms which are prepared by use of the designing board of my invention.

My invention provides a simple and novel device for use both as an educational appliance and as an instrument for use in drawing. With its aid, an endless variety of interesting patterns and geometrical figures may be formed while the user gains valuable training in elementary design and principles of drawing.

The designing board consists essentially of a rigid circular plate, with notches around its periphery corresponding to the vertices of any desired number of regular polygons that may be described within the circumference of the plate. Additional features include provision for using the device as a protractor, whereby points for drawing regular polygons and a great variety of geometric figures may be located.

I have termed the device of my invention the "Artjopat" as filling a need in a wide field of education, geometry, art, pattern designing, trigonometry, arithmetic and mathematics not provided by any device heretofore available.

Referring to the drawings in detail, Fig. 1 shows the simplest form of the device comprising a flat plate or disc 20 having notches spaced at differing and predetermined arcuate distances around the periphery. certain of which I have designated A, N, L, D, K, M and B, and being so located as to define, when aligned by a connecting textile thread as hereinafter explained, all regular polygons up to those with ten sides. The plate may be made of any material that is sufficiently stiff and durable and, if of plastic, may be made in any attractive color. As an interesting pastime for children, the disc may be used for making a large variety of patterns by winding threads of the same or different colors around the notches. The notch designated by the letter A is the base from which all other notches are measured. Notch A is accordingly marked with calibrations 0 through 10, as this notch is used in forming all of the geometrical figures. By passing textile threads over and under the disc, through notches A, K and L, an equilateral triangle $a$, $l$, $k$, will be formed as shown in Fig. 9. By passing threads similarly in notches M, N and D another equilateral triangle $m$, $n$, $d$, will be formed but with its vertex at the bottom instead of at the top as illustrated in Fig. 10. The combination of these two triangles $a$, $l$, $k$, and $m$, $n$, $d$, gives a pattern shown in Fig. 10. One of many other figures that may be formed by passing threads through the six notches is shown in Fig. 11 where all diagonals are formed by threads and the periphery is outlined by thread.

The calibrations in Fig. 1 associated with each of the notches designate fractional parts of the circumference. For example, notch K is common to regular polygons with 3, 6 and 9 sides. Likewise, notch D is common to regular polygons having 4, 6, 8 or 10 sides. The pattern shown in Fig. 12 results from the use of all notches numbered 9, that is, points designating 9 equal divisions of the circumference.

The manner of winding the textile thread across both the front and the rear is shown more clearly in Figs. 5 and 6, where the thread 21 is woven around the designated notches following the calibrations as a guide for selecting the geometric form to be produced. Fig. 5 shows the textile thread looped over the front of the plate while Fig. 6 shows the manner of returning the thread around the rear of the plate at 22. The positions of cross-over have been shown by illustrating the thread in cross section at 23. I have designated the notches adjacent the calibrations 4 or 8 as O, T, Q, E and S in addition to the notches heretofore designated. Thus squares and regular polygons are formed on vertical, horizontal and diagonal axes.

Figs. 3 and 4 show a construction of my device capable of more extensive construction. It differs in that a small round perforation 24 is made at the exact center of the disc and radii 25 are drawn from the center to each of the notches, intersecting concentric circles E, F and G spaced at predetermined distances from the center. For example, if the bottom of the notches lies in a circumference 4" from the center, circles E, F and G may be of 1", 2" and 3" radius respectively. Perforations are arranged in the disc at each intersection of the radii 25 with the circles E, F and G as represented for example at 26, 27 and 28. All of the intersections of the radii 25 with the circles E, F and G have similar perforations symmetrically arranged on each side of the center perforation 24 which have not been indicated by reference characters as they are iterative. By using the disc as a template, any selected points on a given circle may be used to lay out figures of smaller radius than those defined by the outer notches, a pencil being placed in selected holes to mark points on paper underneath.

I have shown in Figs. 7 and 8 a combined template and designing board where the board 30 has a smooth peripheral, circular edge 31, but is perforated at the intersections of radii 32 with circular outlines 33 and 34 as represented at 35 and 36. The board 30 has a central perforation at 37. All figures are formed starting at 0 as a commencement or reference point. Calibrations are provided on each of the radial lines to designate the geometrical figures that are to be formed. The textile thread may be woven through the perforations designated by the radial lines in forming the geometrical figures.

In the forms of my invention shown in Figs. 1–6 the peripheral distances between notches is selected to insure the forming of predetermined outlines of shapes of polygons. It will be observed that the notches are symmetrically arranged on the disc and that the spread varies uniformly in the first and fourth quadrants I and IV and uniformly in the second and third quadrants II and III but the quadrants I and II and quadrants III and IV are dissimilar from each other. This results in a pair of relatively long arcuate projections 38 and 39 on opposite sides of the central axis at the top of the device as shown in Figs. 1, 3 and 5 and projections of approximately one half the said arcuate length at 41 and 42 on either side of the bottom of the central axis through the device. The projections therebetween follow a prearranged but varying pattern which determines the spacing of the calibrated notches for forming the geometric figures. By reason of the selected spacing of the notches the projections in quadrant I progressively increase in arcuate length, starting from projection 43 in a clockwise direction at 44, 45, 46 and 47 through approximately 75° of the quadrant. In the balance of the 15° of the quadrant projections 48 and 49 increase in arcuate length commencing with the projection 48 which is approximately three times the width of the first of the initial series of projections at 43. In quadrant IV the same arrangement of projections is provided except in reverse order. In quadrant II the notches are so spaced for forming the patterns that the projections are arranged into groups of two, the first two projections of which at 50 and 51 have a large ratio of reduction in arcuate length in clockwise direction approximately 5:2; the next two projections of which 52 and 53 have a reverse ratio of arcuate length where projection 52 is shorter in arcuate length than projection 53, in a ratio of approximately 4:5; the next two projections of which 54 and 55 have an increasing ratio of arcuate length of approximately 7:8; and the remaining two projections of which 56 and 41 have an increasing ratio of arcuate length in a ratio of approximately 2:7. The arrangement of notches and projections in quadrant III is similar to the arrangement of quadrant II but in reverse order. That is to say the notches and projections throughout 180° in the two upper quadrants I and IV are symmetrical but in reverse order and the notches and projections in quadrants II and III are symmetrical but in reverse order and differ from the arrangement in the two upper quadrants.

A similar pattern is followed in laying out the radial lines 32 and perforations 35 and 36 in the form of my invention shown in Figs. 7 and 8, wherein the two upper quadrants are similar symmetrical but reversed and the two lower quadrants are similar symmetrical and reversed, for forming geometrical figures and for solving trigonometric and arithmetical problems.

The designing board of my invention can be very inexpensively made in large quantities. For children who are just learning geometrical forms and numbers, or for older children just taking up geometry, this device provides a valuable visual aid and equipment for practice in symmetrical design. For pupils of higher grades it can be used as a drawing instrument and gives a better understanding of many geometrical principles, such as the relation of complementary angles.

The feature of my invention that I particularly desire to emphasize is the arrangement of the calibrations of the disc adjacent the notches in accordance with the figure to be formed. A ten-sided figure, for example, can be formed by connecting all notches numbered 10 including the base notch A. A similar law holds true for all the other calibrations and notches on the disc.

While I have described my invention in certain of its preferred embodiments I desire that it be understood that no limitations upon my invention are intended other than may be imposed by the scope of the appended claims.

What I claim as new and desire to secure by Letters Patent of the United States is as follows:

1. In a device of the class described, a flat plate having a multiplicity of open notches distributed about its periphery for receiving wound loops of thread therearound, said plate being apertured at the center thereof and having radial lines extending therefrom to positions joining the apices of said open notches, said radial lines having perforations distributed along the lengths thereof in a predetermined pattern and numerical calibrations associated with said radial lines designating the number of sides of a polygon which may be selectively formed in outline by winding a thread in selected notches and through selected perforations.

2. In a device of the class described, a flat plate including a pair of peripheral portions connected end to end, each of said peripheral portions having a central division notch therein and a multiplicity of peripheral notches disposed on each side of the central division notch in each of said pair of peripheral portions, the notches on one side of said central division notch being disposed in symmetrical order with respect to the notches on the other side of the central division notch in each of said pair of peripheral portions, said plate having a central aperture therein, radial lines extending from the central aperture to the apices of said notches and perforations disposed in a prearranged pattern along said radial lines and numerical calibrations associated with each of said radial lines for designating the number of sides of a polygon which may be selectively formed in outline by winding a thread through said apertures and around said notches in said plate.

BENTON C. PETERSEN.

REFERENCES CITED

The following references are of record in the file of this patent:

UNITED STATES PATENTS

| Number | Name | Date |
|---|---|---|
| 501,675 | Collins | July 18, 1893 |
| 1,329,850 | Pye | Feb. 3, 1920 |